United States Patent [19]
Jaffe et al.

[11] Patent Number: 5,871,827
[45] Date of Patent: Feb. 16, 1999

[54] FINISHES CONTAINING LIGHT INTERFERENCE PIGMENTS

[75] Inventors: Edward Ephraim Jaffe, Wilmington; Franklin Roberts Hilfiker, Newark; Milton John Misogianes, Wilmington, all of Del.

[73] Assignee: Ciba Specialty Chemicals Corporation, Tarrytown, N.Y.

[21] Appl. No.: 877,948

[22] Filed: Jun. 18, 1997

Related U.S. Application Data

[60] Provisional application Nos. 60/021,233 Jun. 21, 1996, and 60/022,208 Jul. 19, 1996.

[51] Int. Cl.$^6$ .............................. B44F 1/10; B44F 1/14; C09D 5/29; C09D 5/36
[52] U.S. Cl. ..................... 428/29; 106/415; 106/418; 252/586; 427/407.1; 427/419.2; 427/419.3; 428/403; 428/407; 428/425.9; 428/480; 428/363; 428/689; 523/171; 524/80; 524/81; 524/449; 524/450
[58] Field of Search ................. 427/407.1, 409, 427/412.1, 412.5, 388.4, 162, 419.2, 419.3, 214; 428/626, 29, 548, 570, 403, 404, 407, 689, 411.1, 425.9, 480, 363; 523/171; 524/449, 450, 779, 80, 81; 106/415, 418; 252/586

[56] References Cited

U.S. PATENT DOCUMENTS

| | | | |
|---|---|---|---|
| 3,953,643 | 4/1976 | Cheung et al. | 427/388.4 |
| 4,359,504 | 11/1982 | Troy | 427/405 |
| 4,416,940 | 11/1983 | Loye et al. | 427/408.1 |
| 4,434,010 | 2/1984 | Ash | 106/291 |
| 4,551,491 | 11/1985 | Panush | 427/409 |
| 4,615,940 | 10/1986 | Panush et al. | 428/324 |
| 4,814,208 | 3/1989 | Miyazaki et al. | 427/402 |
| 4,879,140 | 11/1989 | Gray et al. | 427/38 |
| 4,965,098 | 10/1990 | Handa et al. | 428/203 |
| 5,025,041 | 6/1991 | Pfenninger et al. | 523/171 |
| 5,135,812 | 8/1992 | Phillips et al. | 428/403 |
| 5,527,848 | 6/1996 | Carpenter et al. | 524/403 |
| 5,552,458 | 9/1996 | Hall et al. | 523/403 |
| 5,556,527 | 9/1996 | Igarashi et al. | 427/409 |
| 5,571,624 | 11/1996 | Phillips et al. | 428/403 |
| 5,607,504 | 3/1997 | Schmid et al. | 106/403 |
| 5,609,918 | 3/1997 | Yamaguchi et al. | 427/409 |
| 5,624,486 | 4/1997 | Schmid et al. | 427/213 |
| 5,624,731 | 4/1997 | Desjardins | 428/143 |
| 5,653,792 | 8/1997 | Phillips et al. | 106/400 |
| 5,693,134 | 12/1997 | Stephens | 427/419.3 |
| 5,698,310 | 12/1997 | Nakamura et al. | 427/388.2 |
| 5,700,515 | 12/1997 | Rodrigues | 427/407.1 |
| 5,718,950 | 2/1998 | Komatsu et al. | 427/419.3 |
| 5,736,239 | 4/1998 | Harada et al. | 428/329 |
| 5,763,086 | 6/1998 | Schmid et al. | 427/213 |

FOREIGN PATENT DOCUMENTS

| | | |
|---|---|---|
| 9517474 | 6/1995 | WIPO . |
| 9517475 | 6/1995 | WIPO . |
| 9517479 | 6/1995 | WIPO . |
| 9517480 | 6/1995 | WIPO . |

*Primary Examiner*—Diana Dudash
*Attorney, Agent, or Firm*—Kevin T. Mansfield

[57] ABSTRACT

This application discloses two-coat and three-coat automotive finishes, articles coated by an automotive finish and a process for their preparation wherein polychromism is achieved in the finish by incorporating an opaque, light interference pigment into the topcoat or a midcoat. The invention further relates to a coating composition which contains an opaque interference pigment at a pigment to binder ratio of less than 7/100.

29 Claims, No Drawings

FINISHES CONTAINING LIGHT INTERFERENCE PIGMENTS

This application claims priority based on provisional applications 60/022,208, filed Jul. 19, 1996, and 60/021,233, filed Jun. 21, 1996.

SUMMARY

This application relates to a process for achieving unique polychromism effects in automotive finishes by applying a two-coat or three-coat automotive finish to a substrate and achieving polychromism in the finish by incorporating an opaque, light interference pigment into the topcoat or a midcoat, which is applied over a colored basecoat, at a pigment to binder ratio of from 0.001/100 to 7/100.

BACKGROUND

Finishes that show significant contrast in color and darkness depending upon the viewing angle, often referred to as "polychromism", "flop" or "travel", are currently considered highly desirable for automotive finishes. In general, flop effects in automotive finishes are currently achieved by use of a two coat system using a basecoat and a clear topcoat, wherein the basecoat contains a combination of a transparent organic and/or inorganic pigment with a metal, like aluminum, or a pearlescent, coated mica pigment.

Recently, a new class of opaque, light interference or optically-variable pigments was described, for example, in U.S. Pat. Nos. 4,879,140, 5,059,245, 4,705,300, 5,281,480, 4,434,010, 4,779,898, 4,838,648, 4,390,866, 5,135,812, 5,171,363, 5,214,530, 5,522,923, 5,527,848, 5,607,504 and 4,705,356, which are here incorporated by reference.

Generally, these publications describe pigments prepared by stacking a transparent dielectric layer and semitransparent (partially reflecting) layer on one or both sides of a reflecting or opaque material to form a layered material having the structure $$M_1/D/M_2 \text{ or } M_1/D/M_2/D/M_1$$

where $M_2$ is an opaque layer, D is a dielectric material and $M_1$ is a semitransparent layer. Generally, the color and degree of polychromism are controlled mainly by the thickness and identity of the dielectric layer, which influences the interference between the light reflected by the semitransparent layer and that reflected by the opaque layer.

In general, such light interference pigments are described as being produced either by plasma vapor deposition of the layers under high vacuum, or by chemical deposition.

U.S. Pat. No. 5,437,931 discloses that some benefits are derived by protecting the $M_1$ semitransparent layer with another layer of dielectric material, D', to form a layered material having the structure $$D'/M_1/D/M_2 \text{ or } D'/M_1/D/M_2/D/M_1/D'$$

This complicated array of layers can be extended even further.

When used in the waterborne basecoats commonly used in the automotive field, metal containing pigments, such as the opaque interference pigments described above, undergo corrosion or oxidation in contact with water, causing undesirable color shifts. U.S. Pat. No. 5,527,848 describes a method to protect the opaque interference pigments from corrosion by outside influences, like water in a water-based paint system, by partial oxidation of the metals contained in the pigment.

EP 668,329, U.S. Pat. No. 5,607,504 and EP 571,836 disclose similar opaque interference pigments which are produced by chemical means whereby aluminum flakes are coated with the dielectric $SiO_2$ precipitated by hydrolysis of tetraalkoxy silane followed by deposition of a semitransparent metallic layer such as molybdenum, chromium, iron etc. or their oxides by decomposition of the corresponding hexa or penta carbonyl compound and subsequent infusion of oxygen. EP 579,091 describes another variation of this approach whereby the dielectric layer is treated with molybdenum which is subsequently oxidized to its oxide and the latter converted to $MoS_2$ by treatment with $H_2S$. EP 690,105 further discloses that the semitransparent layer can be converted to its nitride by contact with ammonia. These pigments also show strong polychromism and are very opaque and chemically stable.

In this application, interference pigments composed of a light interference layer or light interference layers and an opaque layer, such as those described above wherein a light interference layer consisting of the transparent dielectric material and semitransparent layer is applied to one or both sides of an opaque layer, are referred to as opaque interference pigments in order to distinguish them from metal-oxide coated mica pigments, and the like, which have been used in automotive finishes, in combination with a transparent pigment, for some time. The interference layer acts to generate color and polychromism by causing interference between light reflected from different surfaces, for example the semitransparent and opaque layer surfaces, within the light interference layer.

Opaque interference pigments provide remarkable contrast depending upon the angle of viewing when used in coatings, yet are very opaque, producing saturated colors. This is an oxymoron in terms of conventional pigment technology with oxide-coated mica pigments, which are typically combined with a transparent organic and/or inorganic pigment to achieve the desired pearlescent effects. Compared with conventional finishes containing an oxide-coated mica in combination with a transparent pigment, finishes pigmented with an opaque interference pigment provide unique optical effects, depending upon the viewing angle, not attainable with oxide-coated micas, and excellent outdoor durability. In addition, the opaque light interference pigments are incorporated into a paint vehicle by a simple mixing step, often referred to as stir-in pigments in the automotive industry, which does not require an intense dispersion step; whereas the transparent pigments used in combination with an oxide-coated mica or aluminum flakes generally require intense dispersion steps, which add considerably to cost, for incorporation into a paint vehicle due to its high surface area, and therefore, high degree of aggregation.

The opaque interference pigments are used in paints, inks and plastics. In inks they are used primarily to prevent counterfeiting of currency and other legal documents. The use of opaque interference pigments in two-coat automotive finishes has been described. To impart color and the metallic pearlescent effect to coatings, particularly automotive coatings, significant quantities of the opaque interference pigments have been incorporated in the colored basecoat of a basecoat/clearcoat finish. Such high pigment to binder ratios are necessary to have a basecoat which provides complete hiding. However, the high cost of the opaque interference pigments renders the use of finishes having pigment/binder ratios in the appropriate range too expensive for normal use.

These publications do not disclose that the opaque interference pigment could be incorporated into a midcoat or clearcoat applied over an opaque black, white or colored basecoat at a much lower pigment to binder ratio to achieve remarkable polychromism effects in automotive finishes of widely varying color. In this application, the expressions "colored basecoat" and "colored pigment" are intended to include black and white basecoats or pigments.

It has now been discovered that the amount of the opaque interference pigment required to obtain unusual visual effects is drastically reduced (thus reducing cost), while significantly expanding the available color palette, by depositing onto a substrate a three-coat finish comprising a first coating containing an opaque white, black or colored pigment to achieve total hiding, applying a second coating (midcoat) which contains the opaque interference pigment over the first coat, followed by a conventional clearcoat. The first coating is applied onto the primer, or it can serve as a colored primer. The second coat contains a minor quantity of the opaque interference pigment where the pigment/binder ratio ranges from 0.001/100 up to 7/100 at a thickness from 8 to 40 $\mu$m. The second coating does not completely hide the first coating. Thus, the amount of opaque interference pigment applied onto the substrate is dramatically reduced, yet the coated substrate shows unique optical effects resulting from the presence of the opaque interference pigment.

In a further important modification, the substrate is finished with a basecoat/clearcoat finish wherein the clear topcoat having a thickness in the range from 25 to 75 $\mu$m is tinted with the opaque interference pigment and applied directly over an opaque black, white or colored basecoat, which in turn is applied onto the primer or which itself serves as a colored primer. In this modification, the midcoat is eliminated, which further reduces cost, while imparting the desired aesthetic effects.

Since the interference pigments utilized according to the present invention are opaque, they are necessarily used in small concentrations to allow the colored basecoat to show through in both the two-coat and three-coat finishing systems described above. Thus, both the two-coat and three-coat finishes vary in color from yellow to orange to red to violet, blue and green, and have a high degree of polychromism.

Compared to the clearcoat/basecoat technology used with oxide-coated mica pigments, the inventive finishes provide for cost-effective, novel effects, such as remarkable polychromism, without the requirement of using a transparent organic and/or inorganic pigment. Eliminating the transparent pigment drastically reduces rheological problems in paint, thereby decreasing requirements for solvents that lead to environmental pollution. Furthermore, transparent pigments require expensive dispersion processes to break up aggregates and agglomerates formed during their manufacture. The invention eliminates the need for this expensive, time-consuming dispersion process by using an opaque pigment in the basecoat which is typically more easily dispersed than a transparent pigment and presents relatively fewer rheological problems. In addition, the invention produces waterborne and solventborne finishes which generally have improved light and weatherfastness compared with finishes containing a transparent pigment.

In addition, opaque interference pigments used according to the present process do not require a treatment, such as that described in U.S. Pat. No. 5,527,848, in order to prevent corrosion of the metal layers when used with waterborne basecoats.

DETAILED DESCRIPTION OF THE INVENTION

The present invention relates to a process for coating a substrate, which process comprises:

(a) applying a first coating to the substrate, which first coating comprises an effective pigmenting amount of an opaque pigment;

(b) applying a second coating over the first coating, which second coating comprises an effective polychromism-producing amount of an opaque interference pigment, but does not completely hide the first coating.

In particular, the present invention relates to a process which is a three-coat process wherein a clear topcoat is applied over the second coating, and to a two-coat process wherein the second coating is a tinted clearcoat (tinted topcoat), meaning that the opaque interference pigment is dispersed in the topcoat.

The substrate that is coated according to the present process is not critical to the applicability of the inventive process. However, since the inventive process is primarily intended to be utilized as a finishing process for transportation equipment, the more important substrates are materials utilized in the bodies of automobiles, bicycles, motorcycles, vans, trucks, or other vehicles, especially metals, such as steel, iron and aluminum, and plastics, such as thermoplastics, like polycarbonates, polyacrylates and especially thermoplastic polyolefins.

The first coating is applied to a substrate which has been coated with a primer coating, or is applied directly to the substrate as a primer coating. Since the first coating comprises an opaque pigment, it is applied to completely hide the substrate, whether primed or not. In general, the first coating contains an effective hiding amount of an opaque pigment.

The first coating contains an opaque pigment. In this application, the expression "opaque pigment" means a pigment composed of particles that are large enough to provide good hiding and a high degree of light scattering. Generally, opacity is a function of particle size with larger particle size pigments having greater opacity. The maximum opacity occurs with particles having a size which is approximately half the wavelength of maximum absorption.

The opaque pigment utilized in the first coating is an opaque inorganic pigment or an opaque quinacridone, 1,4-diketo-3,6-diarylpyrrolo[3,4-c]pyrrole, azo, azomethine, methine, anthraquinone, phthalocyanine, perinone, perylene, thioindigo, iminoisoindoline, iminoisoindolinone, flavanthrone, indanthrone, anthrapyrimidine and quinophthalone pigment, or a combination thereof. Preferably, the opaque pigment utilized in the first coating is an inorganic pigment selected from carbon black, iron oxide, titanium dioxide, bismuth vanadate, nickel titanate and chromium titanate or an organic pigment which is a quinacridone, 1,4-diketo-3,6-diarylpyrrolo[3,4-c]pyrrole, azo, phthalocyanine, iminoisoindoline, iminoisoindolinone or indanthrone pigment, or a combination thereof.

The phthalocyanine pigments are generally copper phthalocyanine blue and green which are especially applied as a mixture with titanium dioxide, for example a 50/50 mixture, in order to hide the substrate.

A black basecoat provides particularly attractive finishes according to the inventive process. Ordinary gray primers, which are normally composed of a mixture of titanium dioxide and carbon black, are also useful as the basecoat.

In the inventive process, the second coating comprises an opaque interference pigment. Opaque interference pigments useful in the inventive process generally consist of an opaque layer which is covered by one or more light interference layers which act to reflect incoming light from different points within the interference layer to create light interference, resulting in color and polychromism.

The opaque interference pigment is advantageously an interference pigment which essentially consists of flakes of the structure $M_1/D/M_2$ or $M_1/D/M_2/D/M_1$ wherein $M_2$ is an opaque layer which is coated on one or both sides with a transparent dielectric layer, $D_1$ which in turn is coated with a semitransparent layer, $M_1$. Such or similar opaque interference pigments are described, for example, in U.S. Pat. Nos. 4,879,140, 5,059,245, 4,705,300, 5,281,480, 4,434,010, 4,779,898, 4,838,648, 4,390,866, 5,135,812, 5,171,363, 5,214,530, 5,522,923, 5,527,848, 5,607,504 and 4,705,356. Interference pigments of the above structure which are coated with one or more additional dielectric layers or semitransparent layers, or both, such as is described in U.S. Pat. No. 5,437,931, also have utility in the inventive process.

In general, $M_2$ is an opaque metal layer, especially an opaque aluminum layer.

Since $M_2$ must be completely opaque, having a light transmitance less than about 0.1% at 550 nm, it generally must have a thickness of greater than 30 nm, especially if it is composed of aluminum. Preferably, the opaque layer is a metal layer, especially an aluminum layer, having a thickness of from 30 to 90 nm, preferably from 30 to 70 nm, most preferably about 50 nm.

The dielectric layer, $D_1$ is any material which is transparent at visible wavelengths having a dielectric constant preferably less than 1.70 (air=1), most preferably less than about 1.65. The optical thickness (geometric thickness x refractive index) of the dielectric layer is adjusted based on well-known optical principles to give rise to any desired interference color. Materials that are especially useful as the dielectric layer include $MgF_2$, $SiO_2$ and $Al_2O_3$, especially $MgF_2$ and $SiO_2$.

$M_1$ is a semitransparent layer. In general, $M_1$ is a metallic layer which has a transmitance of from about 30% to 40% at 550 nm. However, the transmitance requirement changes with wavelength, with 50% transmitance being the usual target. Preferably, $M_1$ is composed of a metal, such as chromium, molybdenum, tungsten or iron.

In order to practice the present invention, it is important that the second coating does not completely hide the first coating. Thus, at least some of the color of the first coating shows through the second coating.

The second coating is preferably a solvent-based coating. However, if the opaque interference pigment is treated to prevent corrosion of the metal opaque layer, and/or if the pigment is not adversely affected by contact with water, the second coating can be a water-based coating in the inventive process.

In general, the three-coat inventive process produces a coating showing a high degree of polychromism when the second coating has a thickness in the range from 8 to 40 μm, preferably 10 to 20 μm, most preferably about 15 μm and contains the opaque interference pigment at a pigment to binder ratio of from 0.001/100 to 7/100, preferably at a pigment to binder ratio of from 0.001/100 to 3/100, most preferably at a pigment to binder ratio of 0.001/100 to 2/100. Other useful ranges for the pigment to binder ratio of the midcoat include those having a lower limit of from 0.01/100 or 0.10/100 and an upper limit of 2/100, 3/100, 5/100 or 7/100.

In general, the two-coat inventive process produces a coating showing a high degree of polychromism when the second coating, which is equivalent to the topcoat in a conventional automotive finish, has a thickness in the range from 25 to 75 μm, preferably 40 to 65 μm, most preferably about 50 μm and contains the opaque interference pigment at a pigment to binder ratio of from 0.001/100 to 7/100 or 0.001/100 to 5/100, preferably at a pigment to binder ratio of from 0.001/100 to 3/100, most preferably at a pigment to binder ratio of 0.001/100 to 2/100. Other useful ranges for the pigment to binder ratio of the tinted topcoat include those having a lower limit of from 0.01/100 or 0.10/100 and an upper limit of 2/100, 3/100, 5/100 or 7/100. The gloss of the final finish is related to the particle size of the opaque interference pigment, with smaller particle size pigments typically producing high gloss and distinctness of image finishes.

In general, in the inventive processes, the first coating is applied at a rate which totally hides the substrate, preferably to a thickness in the range from 10 to 50 μm, usually about 25 μm. In the three-coat process, the clearcoat generally has a thickness in the range from 25 to 100 μm, usually about 50 μm.

Neither of the first or second coatings normally comprises a transparent pigment. However, it may be possible to include a small amount of a transparent pigment in the second layer. The expression "transparent pigment" is a term of art which is familiar to those in the pigments industry. In general, it refers to a pigment which fails to hide at normal application rates due to its small particle size, which minimizes light scattering. Assuming effective dispersion, it is expected that pigments of smaller particle size will be more transparent than the corresponding larger particle size pigment.

The present invention further relates to a substrate which is coated by the inventive process. Thus, the present invention also includes a coated substrate comprising a first coating and a second coating wherein the first coating comprises an effective pigmenting amount of an opaque pigment; and the second coating comprises an effective polychromism-producing amount of an interference pigment, wherein the second coating does not completely hide the first coating. If the substrate is coated by the inventive three coat process, the second coating is located between the first coating and a transparent topcoat.

All of the discussion above relating to the process also defines the finishes on the inventive coated substrates.

The inventive coated substrate is preferably a transportation vehicle, such as an automobile, bicycle, motorcycle, van, truck or boat.

The present invention also relates to a coating composition that is useful as the second coating in the inventive process. Thus, the present invention relates to a coating composition which comprises a solvent, like water or preferably an organic solvent, a binder and an opaque interference pigment at a pigment to binder ratio less than about 7/100 or 5/100, preferably less than 3/100, most preferably less than 2/100, for example in the range from 0.001/100 up to, but not including, 7/100 or 0.001/100 to 5/100, preferably in the range from 0.001/100 up to, but not including, 3/100, most preferably in the range from 0.001/100 to 2/100. It is preferred that the pigment/binder ratio be as low as needed to achieve the desired finish characteristics.

Preferably, the binder is a heat or light curable high-molecular-weight organic material that is conventionally utilized for the solvent-based clear topcoat in basecoat/clearcoat automotive finishes. In general, such high-molecular-weight organic materials include polyacrylics, polymethacrylics, polyesters, polyurethanes and copolymers thereof.

Preferred coating compositions include those that contain from 40 to 80 percent by weight of the high-molecularweight organic material and an opaque interference pigment at a pigment to binder ratio of from 0.001/100 to 7/100 or 0.001/100 to 5/100, preferably at a pigment to binder ratio of from 0.001/100 to 3/100, most preferably at a pigment to binder ratio of 0.001/100 to 2/100. Normally, the coating compositions also contain other ingredients such as stabilizers, including UV absorbers and hindered amine light stabilizers, dispersants, wetting agents, anti-settling agents and the like.

In general, the coating compositions of the present invention are useful as a tinted clearcoat automotive finish. The coating compositions of the present invention do not include ink compositions which generally have a higher pigment to binder ratio.

The following examples illustrate, but do not limit, the present invention. All parts are parts by weight unless otherwise specified. The pigments utilized for the basecoats are identified by the designation given in the Color Index, which is published by jointly by the Society of Dyers and Colourists and the American Association of Textile Chemists and Colorists.

All reflectance spectra are taken from painted panels using an MAG8 Multiple Angle Spectrophotometer (available from X-RITE of Grandville Mich.). Reflectance spectra are obtained under D65 normal light illumination under angles away from the gloss angle (90° off the illumination source). The measured values are referenced to a white diffuse reference standard.

EXAMPLES 1–3

The following describes the incorporation of several pigment types into a three coat automotive system.

Basecoats—Millbase Formulations

1A. Millbase Formulation for Pigment Red 254 and Pigment Violet 19

A vessel is charged with 46.2 grams of acrylourethane resin (68% solids), 25.2 grams polymeric dispersant (55% solids) and 46.2 grams of aromatic hydrocarbon solvent (Solvesso 100). 47.4 grams of pigment and 980 grams of 4 mm diameter steel rods are added. The mixture is milled for 48 hours on a roller mill at 100 rpm. The resulting millbase contains 28% pigment with a pigment/binder ratio of 100/100 and a total non-volatile content of 56.0%.

1B. Millbase Formulation for Other Pigments

A vessel is charged with 38.8 grams of acrylourethane resin and 113.0 grams of aromatic hydrocarbon solvent (Solvesso 100). 13.2 grams of pigment (Pigment Black 6, Pigment Yellow 110, Pigment Yellow 139, Pigment Blue 15.2, Pigment Green 7) and 980 grams of 4 mm diameter steel rods or ½" ceramic balls (PY110, PY139) are added. The mixture is milled for 48 hours on a roller mill at 100 rpm. The millbase contains 8.0% pigment with a pigment/binder ratio 50/100 and a total non-volatile content of 24.0%.

1C. Milling Formulation for Pigment Yellow 184

A vessel is charged with 35.3 grams acrylourethane resin, 63.75 grams of aromatic hydrocarbon solvent (Solvesso 100). 66 grams of pigment and 800 grams of ½" ceramic balls are added. The mixture is milled for 24 hours on a roller mill. The millbase contains 40% pigment with a pigment/binder ratio of 277/100 and a total non-volatile content of 54.5%.

1D. Titanium Dioxide Millbase Formation

A $TiO_2$ millbase is prepared by mixing the following ingredients:

604.1 grams of a $TiO_2$ pigment (DuPont R-960)

129.8 grams of acrylourethane resin, and, 161.1 grams of aromatic hydrocarbon solvent (Solvesso 100)

One pint of ½" ceramic balls are added. The millbase is dispersed for 24 hours on a roller mill. The "$TiO_2$" dispersion contains 67.5% pigment with a total non-volatile content of 77.4%.

Basecoats—Basecoat Formulations

2A. Basecoat Formulation for PR 254 and PV 19

30.2 grams of millbase prepared according to Example 1A, 20.3 grams of a clear solids solution (48.1% solids) containing a melamine resin catalyst, non-aqueous dispersion resin and a UV absorber, and 49.5 grams of a balancing solid color solution (58.0% solids) containing a polyester urethane resin and solvent are mixed and diluted with a solvent mixture containing 76 parts xylene, 21 parts butanol and 3 parts methanol to a spray viscosity of 20–22 seconds measured by a #2 Fisher Cup.

2B. Basecoat Formulation for Other Pigments 64.3 grams of millbase prepared according to Example 1B, 24.7 grams of clear solids solution containing a melamine resin catalyst, non-aqueous dispersion of resin and a UV absorber and 11.0 grams of a balancing solid color solution described above containing a polyester urethane resin are mixed and diluted with a solvent mixture containing 76 parts xylene, 21 parts butanol and 3 parts methanol to a spray viscosity of 20–22 seconds measured by a #2 Fisher Cup.

2C. Basecoat Formulation for PY184

66.7 grams of the millbase described in Example 1C, 10.0 grams of clear solids solution, and 23.3 grams of a balancing solid color solution containing a polyester urethane resin are mixed and diluted with a solvent mixture containing 76 parts xylene, 21 parts butanol and 3 parts methanol to a spray viscosity of 20–22 seconds measured by a #2 Fisher Cup.

2D. 50/50 Tint Basecoat Formulation for PB 15.2 and PG7

A 50/50 tint shade is prepared by mixing the following ingredients: 57.7 grams of millbase described in 1B, 8.6 grams of $TiO_2$ dispersion described in 1C, 22.7 grams of clear solids solution and 10.0 grams of a balancing solid color solution described in 2A are mixed and diluted as above.

2E. Midcoat Formulations

The opaque interference pigments of the structure $M_1/D/M_2/D/M_1$ of the color described below are formulated into midcoat formulations according to the recipes that follow. The color of the pigment is controlled by varying the thickness of the dielectric layers.

Interference Pigment Color Shade

Greenish Gold to Silver

Yellowish Gold to Silver

Blue to Red

Red to Gold

These pigments are incorporated into several different midcoats by mixing pigment and paint vehicle on a laboratory mixer.

Each midcoat has the following formula:

| Midcoat Pigment/Binder | Composition |
| --- | --- |
| 0.0015/100 | 100 grams of clearcoat (60% solids) + 0.0009 grams pigment |
| 0.015/100 | 100 grams of clearcoat (60% solids) + 0.009 grams pigment |
| 0.15/100 | 190 grams of clearcoat (60% solids) + 0.09 grams pigment |
| 1.5/100 | 100 grams of clearcoat (60% solids) + 0.9 grams pigment |
| 3/100 | 100 grams of clearcoat (60% solids) + 1.80 grams of pigment |
| 5/100 | 100 grams of clearcoat (60% solids) + 3.0 grams of pigment |

3A. Masstone and Tint Application

One of the basecoat formulations prepared according to Examples 2A–2D is sprayed onto a panel twice in a 90 second interval as a basecoat. After 60 minutes flash time, a midcoat formulation according to Example 2E is sprayed twice at 90 second intervals onto the basecoat. After an additional 60 minute flash time, a clearcoat resin solution is applied and flashed for 60 minutes. The system is baked in an oven at 265° F. for 30 minutes. Typical dry film thicknesses of each coat in this tri-coat system are as follows:

Basecoat=10–50 microns, preferably 20–40 microns

Midcoat=8–40 microns, preferably 10–20 microns

Clearcoat=25–75 microns, preferably 40–65 microns

The following table summarizes the colors that are obtained using various midcoat/basecoat combinations at pigment to binder ratios of 1.5/100.

| Midcoat Pigment | Basecoat Pigment | Reflectance at an Angle of 25° From the Gloss Angle | | |
| --- | --- | --- | --- | --- |
| | | L | A | B |
| Greenish Gold to Silver | PY 184 | 68.7 | −6.0 | 67.7 |
| Greenish Gold to Silver | PY 110 | 52.7 | 19.9 | 55.6 |
| Greenish Gold to Silver | PG 7 & TiO$_2$ (50/50) | 65.7 | −14.9 | 42.3 |
| Greenish Gold to Silver | PB 6 | 60.2 | −2.5 | 43.0 |
| Yellowish Gold to Silver | PY 184 | 75.2 | −2.0 | 80.0 |
| Yellowish Gold to Silver | PY 139 | 59.8 | 29.1 | 79.1 |
| Yellowish Gold to Silver | PB 6 | 28.3 | 11.7 | 31.1 |
| Yellowish Gold to Silver | PY 110 | 53.4 | 30.0 | 70.2 |
| Blue to Red | PV 19 | 26.0 | 35.2 | −17.3 |
| Blue to Red | PB 6 | 19.3 | 14.8 | −28.7 |
| Blue to Red | PB 15.3 & TiO$_2$ (50/50) | 28.8 | −3.2 | −35.7 |
| Red to Gold | PV 19 | 46.5 | 37.7 | 44.9 |
| Red to Gold | PR 254 | 39.2 | 49.9 | 48.0 |
| Red to Gold | PB 6 | 44.4 | 33.3 | 42.9 |

The primary color of the finish is controlled by the identity of the pigment utilized in the basecoat and the midcoat. The degree of polychromism is controlled by the pigment/binder ratio of the opaque interference pigment in the midcoat and the thickness of the midcoat. In each instance, the finished panel shows polychromism even at a pigment to binder ratio of 0.0015/100.

EXAMPLE 4. Two Coat Finish

4A. Tinted Clearcoat Formulation

The red to gold opaque interference pigment described in Example 2E is incorporated into four clearcoat formulations to yield tinted clearcoat formulations having pigment to binder ratios of 0.0015/100, 0.015/100, 1.5/100 and 5/100 by mixing the pigment and clearcoat on a laboratory mixer in the amounts described below. The clearcoat is a conventional automotive formulation composed of a mixture of acrylic resins (60% solids) in a blend of ester and hydrocarbon solvents which contains 3.9% of stabilizer (UV absorber/hindered amine light stabilizer).

| Tinted Clearcoat Pigment/Binder Ratio | Composition |
| --- | --- |
| (1) 0.0015/100 | 100 g of clearcoat (60% solids) + 0.0009 g pigment |
| (2) 0.15/100 | 100 g of clearcoat (60% solids) + 0.09 g of pigment |
| (3) 1.5/100 | 100 g of clearcoat (60% solids) + 0.9 g of pigment |
| (4) 5/100 | 100 g of clearcoat (60% solids) + 3.0 g of pigment |

4B. Basecoat and Tinted Clear Application

One of the basecoat formulations described in Examples 2A (Pigment Violet 19) and 2B (Pigment Black 6) is sprayed onto a panel twice in a 90 second interval as a basecoat. After a 60 minute flash time, one of the tinted clearcoat formulations described in Example 4A is sprayed four times at 90 second intervals onto the basecoat. The sprayed panel is then "flashed" for 60 minutes. The two-coat panel is then baked in an oven at 265° F. for 30 minutes. Typically, the dry basecoat has a thickness of about 25 μm. The dry tinted clearcoat film typically has a thickness of about 50 μm.

Each of the finishes shows polychromism. The panels with PV 19 as basecoat and the red to gold interference pigment in the topcoat have a distinct polychromism and a primary golden color with bluish-red background when viewed at 90°. The panels with PB 6 as basecoat and the red to gold interference pigment in the topcoat have a primary color of black with a golden interference color when viewed at 90° and distinct polychromism.

Finishes with each of the following basecoat/clearcoat pigment combinations are obtained by preparing the basecoat formulation according to Example 2, the tinted clearcoat formulation according to Example 4A, and applying the finish according to Example 4B.

| Tinted Clearcoat Pigment | Basecoat Pigment |
| --- | --- |
| Greenish Gold to Silver | PY 184 |
| Greenish Gold to Silver | PY 110 |
| Greenish Gold to Silver | PG 7 & TiO$_2$ (50/50) |
| Greenish Gold to Silver | PB 6 |
| Yellowish Gold to Silver | PY 184 |

-continued

| Tinted Clearcoat Pigment | Basecoat Pigment |
|---|---|
| Yellowish Gold to Silver | PY 139 |
| Yellowish Gold to Silver | PB 6 |
| Yellowish Gold to Silver | PY 110 |
| Blue to Red | PV 19 |
| Blue to Red | PB 6 |
| Blue to Red | PB 15.2 & TiO$_2$ (50/50) |
| Red to Gold | PV 19 |
| Red to Gold | PR 254 |
| Red to Gold | PB 6 |

Tinted clearcoats having a pigment/binder ratio of 0.0015/100, 0.015/100, 1.5/100, and 5/100 and a thickness of about 50 μm are applied for each of the above-described basecoat/clearcoat pigment combinations. In each instance, a finish showing polychromism is obtained. Reflectance measurements are similar to those obtained with the three-coat systems described in Example 3, as shown by the comparison of the reflectance measured at 25° from the gloss angle of a panel with PB 6 in the basecoat and the Red to Gold opaque interference pigment at a pigment to binder ratio of 1.5/100 in the midcoat (L=43.4, A=33.3, B=43.2) or topcoat (L=44.4, A=33.3, B=42.9), or with PV 19 in the basecoat and the Red to Gold opaque interference pigment at a pigment to binder ratio of 3/100 in the midcoat (L=52.3, A=38.9, B=50.2) or topcoat (L=53.4, A=39.6, B=50.4) or with red iron oxide in the basecoat and the Red to Gold opaque interference pigment at a pigment to binder ratio of 0.15/100 in the midcoat (L=30.4, A=31.8, B=32.6) or topcoat (L=30.4, A=32.2, B=33.1).

Observations

By comparing the reflectance spectra of painted panels at various angles relative to the gloss angle (90° off the illumination source), it is observed that the relative reflection of the inventive finishes is higher than would be expected on a proportional basis from the reflectance of a panel covered to complete hiding with the opaque interference pigment as the basecoat in a conventional basecoat/clearcoat automotive finish. Thus, a carbon black pigmented basecoat overcoated with the red to gold interference pigment at a P/B ratio of 1.5/100 shows a % of maximum reflection at 650 nm and angles of 15° and 25° that is respectively 384% and 368% relative to a panel covered with a conventional basecoat/clearcoat automotive finish having a basecoat pigmented with the same interference pigment at a P/B ratio of 15/100, whereas one would expect the reflectance to be only about 10% on a strictly proportional basis.

This beneficial disparity is best observed with a black basecoat since the black basecoat shows no color reflection. It is more difficult to measure the effect when a colored basecoat is used since the basecoat also adds to the overall reflectance, but the advantage is still apparent. Since quinacridone (PV 19) (RT-385-D from Ciba) does not reflect light at about 410 nm and the red to blue opaque interference pigment does, a comparison can be made with this system. Thus, a basecoat of PV 19 overcoated as the second coating with a blue to red opaque interference pigment at a P/B ratio of 1.5/100 demonstrates greater reflectance than would be expected relative to the reflectance of a panel covered to complete hiding at a P/B ratio of 15/100 with the same interference pigment and then covered with a topcoat; the observed reflectance being 136% at 15° and 161% at 25° versus the expected 10%.

Based on these observations, it is expected for a finish prepared according to the inventive process to have a higher than proportional reflection at the reflection maxima relative to a finish containing a hiding amount of the same interference pigment as the basecoat in a conventional basecoat/clearcoat finish. However, this advantage may be more or less difficult to measure depending on the coloristic properties of the basecoat and the opaque interference pigment in the midcoat or topcoat.

We claim:

1. A process for coating a substrate, which process comprises:
   (a) applying a first coating to the substrate, which first coating comprises an effective pigmenting amount of an opaque pigment;
   (b) applying a second coating over the first coating, which second coating comprises an effective polychromism-producing amount of an opaque interference pigment, but does not completely hide the first coating.

2. A process of claim 1 which is a three-coat process wherein a clear topcoat is applied over the second coating.

3. A process of claim 1 which is a two-coat process wherein the second coating is a tinted topcoat.

4. A process of claim 1 wherein the first coating is a primer.

5. A process of claim 1 wherein the opaque pigment is an opaque inorganic pigment or an opaque quinacridone, 1,4-diketo-3,6-diarylpyrrolo[3,4-c]pyrrole, azo, azomethine, methine, anthraquinone, phthalocyanine, perinone, perylene, thioindigo, iminoisoindoline, iminoisoindolinone, flavanthrone, indanthrone, anthrapyrimidine and quinophthalone pigment, or a combination thereof.

6. A process of claim 5 wherein the opaque pigment is an inorganic pigment selected from carbon black, iron oxide, titanium dioxide, bismuth vanadate, nickel titanate and chromium titanate, or a combination thereof.

7. A process of claim 5 wherein the opaque pigment is an opaque quinacridone, 1,4-diketo-3,6-diarylpyrrolo[3,4-c]pyrrole, azo, phthalocyanine, iminoisoindoline, iminoisoindolinone, or indanthrone pigment, or a combination thereof.

8. A process of claim 1 wherein the opaque interference pigment consists of flakes of the structure $M_1/D/M_2$ or $M_1/D/M_2/D/M_1$ wherein $M_2$ is an opaque layer which is coated on one or both sides with a transparent dielectric layer, $D_1$ which in turn is coated with a semitransparent layer, $M_1$.

9. A process of claim 2 wherein the second coating has a thickness in the range from 8 to 40 μm and contains the opaque interference pigment at a pigment to binder ratio of from 0.001/100 to 7/100.

10. A process of claim 9 wherein the pigment to binder ratio is in the range from 0.001/100 to 3/100.

11. A process of claim 9 wherein the pigment to binder ratio is in the range from 0.001/100 to 2/100.

12. A process of claim 9 wherein the second coating has a thickness in the range from 10 to 20 μm and contains the opaque interference pigment at a pigment to binder ratio of from 0.001/100 to 3/100.

13. A process of claim 12 wherein the pigment to binder ratio is in the range from 0.001 to 2/100.

14. A process of claim 3 wherein the second coating has a thickness in the range from 25 to 75 μm and contains the opaque interference pigment at a pigment to binder ratio of from 0.001/100 to 7/100.

15. A process of claim 14 wherein the pigment to binder ratio is in the range from 0.001/100 to 3/100.

16. A process of claim 14 wherein the pigment to binder ratio is in the range from 0.001/100 to 2/100.

17. A process of claim 14 wherein the second coating has a thickness in the range from 40 to 65 $\mu$m and contains the opaque interference pigment at a pigment to binder ratio of from 0.001/100 to 3/100.

18. A process of claim 17 wherein the pigment to binder ratio is in the range from 0.001 to 2/100.

19. A process of claim 2 wherein the clearcoat has a thickness in the range from 25 to 75 $\mu$m.

20. A process of claim 1 wherein the first coating is a waterborne basecoat.

21. A coated substrate comprising a first coating and a second coating wherein the first coating comprises an effective pigmenting amount of an opaque pigment; and the second coating comprises an effective flop-producing amount of an opaque interference pigment, but does not completely hide the first coating.

22. A coated substrate of claim 21 wherein the second coating is located between the first coating and a transparent topcoat.

23. A coating composition which comprises a solvent, a binder and an opaque interference pigment at a pigment to binder ratio of less than 7/100.

24. A coating composition of claim 23 wherein the coating composition is a tinted automotive clearcoat formulation.

25. A coating composition of claim 24 wherein the binder is a high-molecular-weight organic material selected from the group consisting of polyacrylics, polymethacrylics, polyesters, polyurethanes and copolymers thereof.

26. A coating composition of claim 25 which additionally comprises a stabilizer, a dispersant, a wetting agent, or an anti-settling agent.

27. A coating composition of claim 24 wherein the pigment to binder ratio is in the range from 0.001/100 to 5/100.

28. A coating composition of claim 24 wherein the pigment to binder ratio is in the range from 0.001/100 to 3/100.

29. A coating composition of claim 24 wherein the pigment to binder ratio is in the range from 0.001/100 to 2/100.

* * * * *